UNITED STATES PATENT OFFICE.

FRANK MENOWN, OF KANSAS CITY, MISSOURI.

COMPOUND FOR COATING ROASTED COFFEE.

SPECIFICATION forming part of Letters Patent No. 448,660, dated March 24, 1891.

Application filed November 10, 1890. Serial No. 370,954. (No specimens.)

*To all whom it may concern:*

Be it known that I, FRANK MENOWN, of Kansas City, Jackson county, Missouri, have invented certain new and useful Improvements in a Compound for Preserving the Flavor of Roasted Coffee, of which the following is a full, clear, and exact description.

My invention relates to compounds for coating roasted coffee to preserve the flavor thereof; and it consists of the following ingredients: three-fourths of a pound of cocoa-shells, three ounces of chicory, two gallons of water, three and one-half pounds of starch or rice-flour, one and one-half pound of flour, one-half of a gallon of glucose, and three-eighths of an ounce of salicylic acid.

The cocoa-shells, chicory, and water I first boil together. Then I take the starch, flour, glucose, and salicylic acid and mix them well together, after which I strain the liquid of the cocoa-shells and chicory and mix the whole. Lastly, I boil all together for about five minutes.

The compound is applied in the following manner: I take about one and one-half quart of the mixture, (which is sufficient to coat one hundred and seventy pounds of coffee,) dissolve it in two gallons of water, and pour it over the coffee when it is discharged from the roasting-cylinder to the cooling-pan. The whole is then well stirred and the operation is completed.

The above proportions will accomplish the same result for any desired quantity.

Having thus described my invention, what I claim is—

The compound for coating roasted coffee, consisting of cocoa-shells, chicory, water, starch or rice-flour, flour, glucose, and salicylic acid.

In testimony whereof I affix my signature in presence of two witnesses.

FRANK MENOWN.

Witnesses:
GEO. Y. THORPE,
H. E. PRICE.